April 15, 1952     E. R. SIMON     2,593,065
RESILIENT SOIL-WORKING TOOTHED WHEEL
Filed Aug. 19, 1947     2 SHEETS—SHEET 1

INVENTOR.
EUGENE R. SIMON
BY
ATTORNEY.

April 15, 1952 E. R. SIMON 2,593,065
RESILIENT SOIL-WORKING TOOTHED WHEEL
Filed Aug. 19, 1947 2 SHEETS—SHEET 2

INVENTOR.
EUGENE R. SIMON
BY
*Harry P. Canfield*
ATTORNEY.

Patented Apr. 15, 1952

2,593,065

UNITED STATES PATENT OFFICE 2,593,065

RESILIENT SOIL-WORKING TOOTHED WHEEL

Eugene R. Simon, Petersburg, Ill.

Application August 19, 1947, Serial No. 769,485

4 Claims. (Cl. 97—216)

This invention relates to agricultural implements generally of the harrow class, having toothed wheels for tilling the soil, and relates particularly to the toothed wheels themselves.

Toothed wheels of this type are known comprising generally a central body having teeth radiating therefrom, and provided with a bearing for rotation on an implement frame shaft. A number of such wheels are commonly mounted side by side on the shaft in a gang, and support the implement frame; and roll along the ground when the implement frame is propelled; the teeth working the soil as the wheels roll.

In some soils, the teeth on some of the rotating wheels of a gang of this type, encounter hard spots, rocks, roots, etc. from time to time which they are unable to penetrate, and in rolling thereover, they may raise the gang or part of it and elevate the teeth of other wheels of the gang, out of the soil, or cause them to work at a shallow soil depth. In some cases, this may bend or otherwise deform the teeth that encounter the rock, etc.

It has been proposed to correct this defect by mounting the teeth on the wheel yieldably, by means of some kind of a spring arrangement, to spring-press the teeth into the soil; whereby a single tooth on a wheel or all of its teeth successively may yield without disturbing the working depth of other wheels of the gang, and without injury to the teeth.

Such prior arrangements have not been satisfactory because of cost and defects in the mode of operation. Heretofore the cost of such wheels has been too great. Many wheels are sometimes used in a single gang and there are often several gangs on the implement, so that a saving of a few cents of manufacturing cost per wheel becomes important.

Also, as a toothed wheel rolls along the ground, the teeth which are directly under the rotary axis or implement shaft, work at full working depth. The teeth more rearwardly gradually come out of the ground and plow up and pulverize the soil.

When teeth are made yieldable, as here considered, and a tooth which has yielded comes to the rearward position where it would normally gradually come out of the ground, it is desirable for the tooth to then quickly take up its normal unyielded position to thereby plow up and pulverize the soil as much as possible even at the shallow depth to which it had penetrated because of yielding.

In prior yieldable teeth this action has not been performed satisfactorily because of the construction of the spring arrangement which makes the tooth yieldable.

It is among the objects of the invention:

To provide a toothed wheel of the yieldable tooth class which can be manufactured at low cost.

To provide a toothed wheel of the spring-pressed yieldable-tooth class, comprising a one piece body of sheet metal, and steel teeth yieldably mounted thereon in an improved manner.

To provide a toothed wheel of the spring-pressed yieldable-tooth class, comprising among other features a one piece body press-formed from sheet metal with tooth guides formed thereon; teeth guided in the guides to move radially; an improved spring arrangement for yieldably pressing the teeth outwardly radially; and improved means for preventing the teeth from rotating on the body while guided, whereby the advantages of curved teeth at the soil working portions may be had.

Other objects will be apparent to those skilled in the art to which the invention appertains.

The invention is fully disclosed in the following description taken in connection with the accompanying drawing, in which.

Figure 1:
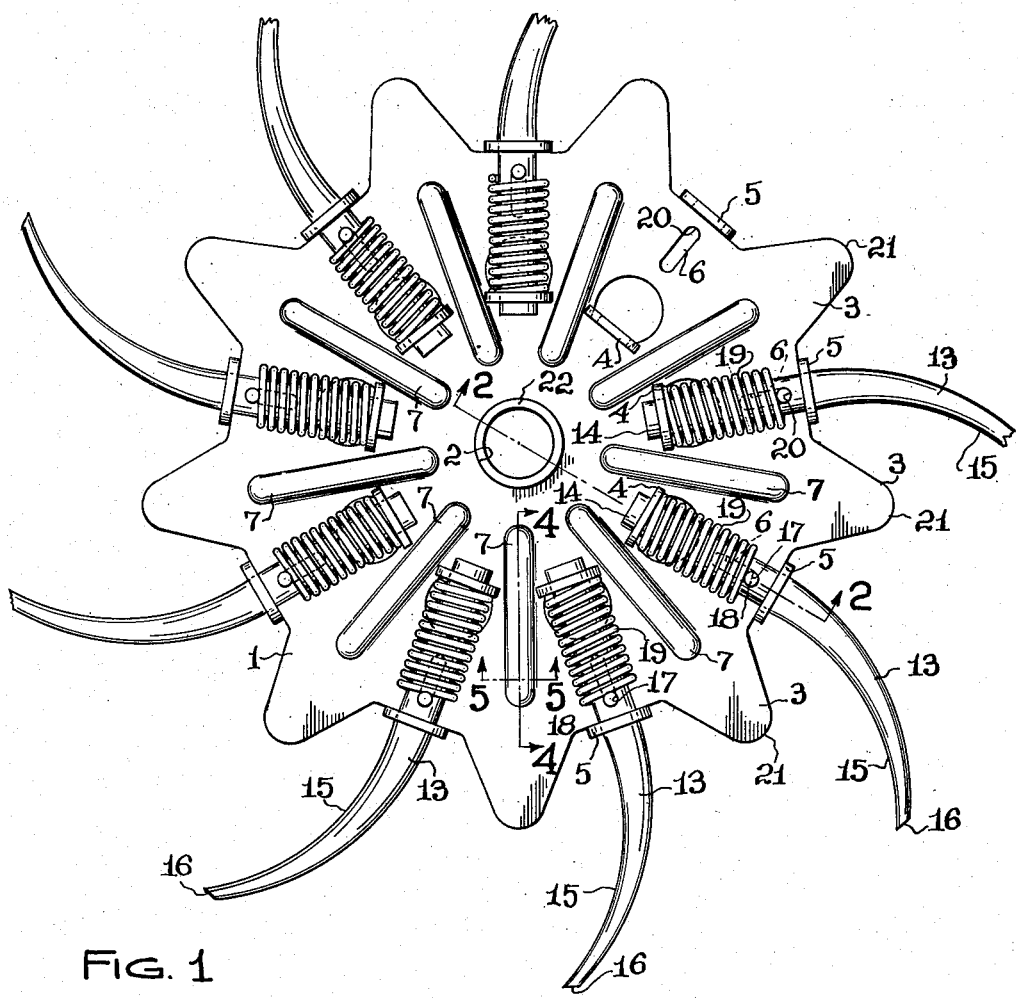
Fig. 1 is a side view of a toothed wheel embodying the invention with one tooth omitted; and drawn to reduced scale.
Figure 4:
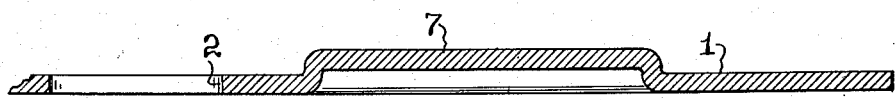
Figure 5:
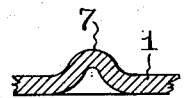
Figure 2:
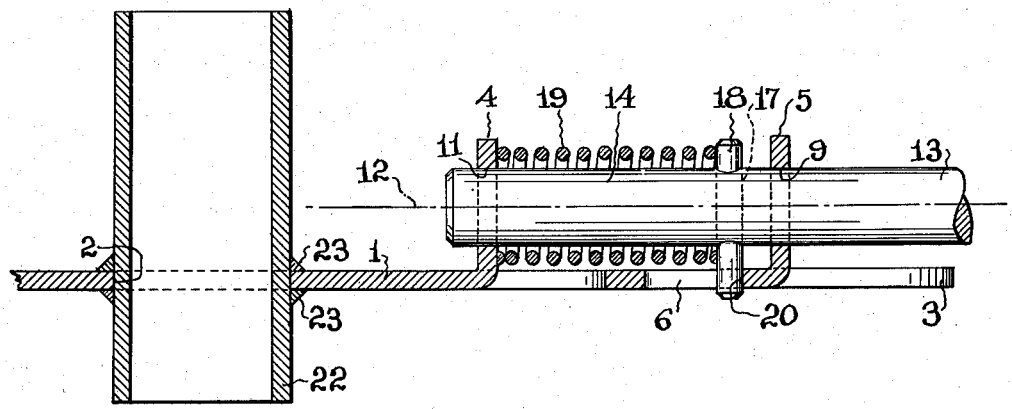
Fig. 2 is a sectional view from the plane 2—2 of Fig. 1 to enlarged scale and approximately full scale.

Figs. 4 and 5 are fragmentary sectional views from the planes 4—4 and 5—5 respectively of Fig. 1.

Referring to the drawing, I have shown generally at 1 a sheet metal body, having a central perforation 2, and peripheral outwardly radially extending projections 3—3, and the same lying substantially in a plane. Between each pair of projections, and in mutual radial alignment is a pair of upstanding ears 4—5; and between them and in radial alignment therewith is a slot 6 in the body 1.

Extending radially of the wheel, and between each pair of ears 4—5, are reinforcing ribs 7—7.

The whole wheel as thus far described is a one-piece sheet metal stamping or wheel base; and may be blanked out, and the ears 4—5 bent upwardly therefrom and the ribs 7—7 formed by one operation, or if preferred, by a few operations in a power press machine, by using a suitable die or dies and those skilled in the art will know how to make the die or dies.

Figure 3:
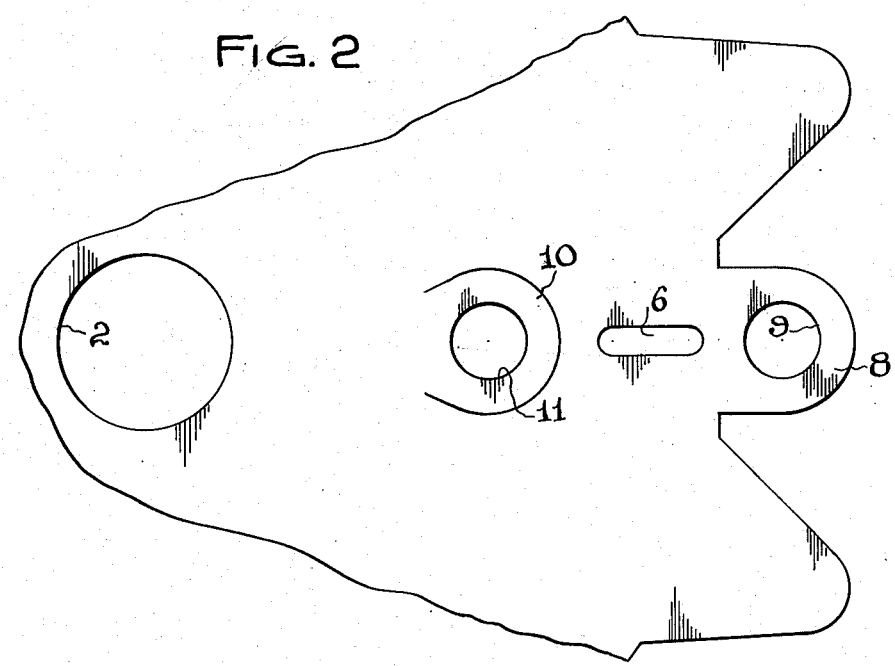
Fig. 3 is a view of a fragment of the main body of the wheel of Fig. 1, substantially to full scale, illustrating a step of the process of making it.

During the process of making the body 1 as aforesaid, and to provide the said ears 4—5, the body 1 when blanked out and as shown in Fig. 3 has an outwardly radially extending tongue 8 between each pair of projections 3—3 provided with a circular perforation 9; and radially aligned therewith a tongue 10 having a circular perforation 11 therein, sheared from the sheet metal body 1, but remaining substantially in the plane of the body.

These tongues 8 and 10 are then bent up until they are substantially at right angles to the plane of the body 1, and become the ears 5 and 4, respectively; the parts being predesigned so that the perforations 9 and 10 of the ears are in alignment and have a common radial axis 12, preferably parallel to a radius of the body 1.

The projections 3—3 extend outwardly beyond the radially outermost ear 5.

Soil working teeth 13—13 are provided each having a round or circular-section straight shank 14 telescopable into and slidingly fitting the aligned perforations 9 and 11; and having a radially outer curved ground working portion 15; and a soil penetrating end 16. These teeth may be made and formed from round section stock as described in my Patent No. 2,559,232, issued July 3, 1951.

The shank has a hole 17 drilled transversely therethrough; and after the shank has been telescoped in place in the ear perforations as aforesaid, a pin 18 of predetermined diameter is driven into the hole 15 and is of such length as to project from both ends of the hole; at one end projecting into or through the slot 6.

The width of the slot 6 is slightly greater than the diameter of the pin 18 to permit the pin to slide therein as will be described, while at the same time preventing rotation of the shank 14 in the ears 4—5.

The position of the pin in the shank 14 is predetermined preferably so that when the pin is in the slot 6, the whole tooth including the curved working portion 15 will lie substantially in a plane of wheel rotation parallel to the plane of the body 1, whereby the penetration of the tooth into the soil and working of the soil will exert little rotary force on the tooth shank 14, and so that the pin 18 can slide in the slot 6 without undue drag or friction and wear with the side edges of the slot.

At the time of telescoping the shank 14 through the ears 4—5, and driving in the pin 18, the shank is also telescoped through a coiled compression spring 19 disposed between the ears 4—5; so that the spring will surround the shank and abut at opposite ends upon the ear 4 and the pin 18.

The spring 19 when in assembled position, and acting on the pin 18, moves it and the tooth outwardly until the pin engages the outer end 20 of the slot 6, as an abutment or stop. The ends 20 of all of the slots 6 are made equally distant from the center of the wheel and the teeth 13 are all alike, and the pins 18 are all located homologously in all of the shanks 14, so that the outer ends 16 of the teeth are normally held by the springs, on a circle coaxial with the central rotary bearing of the wheel, to be described.

In operation, it will be apparent that any tooth or teeth will yield, as hereinbefore referred to, by sliding in the ears 4—5 against the force of the spring 19.

The springs are compressed and pre-loaded when in assembled position; and the pre-loading is predetermined by a selection of springs to adapt the wheel to a given soil condition. The pre-loading may therefore be adjusted for different soil conditions.

After a tooth has yielded, as aforesaid, turning of the wheel brings the yielding tooth rearwardly of the rotary axis, and at an angle to the ground surface, and then the soil resistance to tooth penetration becomes less, and since the force of the spring is radial, it will snap the tooth outwardly to its normal position and cause the tooth to work the soil before wheel rotation causes it to emerge therefrom.

The projections 3—3 are thin at their side edges, having only the thickness of the sheet metal body, and as they approach the soil by wheel rotation, act as blades and exert a clod cutting and soil pulverizing action. At the same time, the projections are tapering or wedge-shaped as shown and blunt on their outer ends as at 21, whereby they resist radial penetration into the soil. Between the pairs of projections are the radially outward ears 5—5. The combined action of these parts is to limit or predetermine the depth in the soil at which the wheel as a whole penetrates, the wheel in average soil rotating on the ground on a circle coincident with the outer ears 5—5.

A bearing hub for the wheel for rotation on an implement shaft is provided by a tubular piece 22 projected through the central perforation 2, disposed at right angles to the wheel body 1 (by a jig not shown) and welded thereto as at 23.

The radial thrust of the teeth 13 is as aforesaid in a plane offset from the face of the body 1, and this thrust is transmitted to the wheel hub.

To equalize wear on the bore of the tubular hub, it is positioned on the wheel as shown, to project farther from one face of the wheel than from the other, so that the said thrust plane will pass through the middle of the hub.

Any tendency of the sheet metal body 1 to bend due to this offset thrust is counteracted by the ribs 7—7; so that the wheel body can be of thin sheet metal with a corresponding saving in cost of material.

I have found that for steel teeth made from round stock ½ inch to $\tfrac{1}{8}$ inch in diameter, and working the soil at the full depth referred to, the steel wheel body will be strong enough to resist distortion if it is only ⅛ inch to %4 inch thick. Due to the yielding of the teeth, the forces to which the body is subjected are limited to a predetermined maximum.

It is to be understood that in operation the teeth shanks 14 do not continually slide back and forth in the ears 4 and 5; but do so only occasionally and then only one or a few of them at a time, as a tooth or a few teeth encounter a rock or root or an impenetrably hard spot in the soil, so that there is little and negligible wear on the ears 4—5, shanks 14, pins 18, and slots 6; and thin, economical, sheet-metal provides sufficient bearing area at these parts.

I claim:

1. A rotary, agricultural, soil-working, toothed-wheel comprising a one-piece, generally circular, sheet-metal, stamped-out body having a central perforation and having peripheral, circumferentially equally spaced, radially outwardly extending and tapering projections, the body and projections lying in substantially the same plane; the body between each pair of projections having a pair of radially aligned and spaced apart ears bent integrally from the sheet metal of the body and extending substantially at right angles to the body and having circular aligned perforations therein, respectively, on a common radial axis, a circular series of radial slots in the body closed at both ends each disposed between and under the common axis of a pair of ears; a plurality of soil working teeth each having a straight round-section shank slidingly telescoped through the aligned perforations of a pair of ears; a pin extending transversely through each shank between the corresponding pair of ears; opposite end portions of the pin projecting from the sides of the shank, one end portion of the pin projecting loosely into the corresponding slot; a coil compression spring surrounding the shank and abutting upon the radially inner ear and the projecting end portions of the pin; each tooth having a curved soil working portion outwardly of the body lying substantially in a plane of wheel rotation parallel to the body; the pins and slots disposed to stop outward spring pressed movement of the teeth shanks by engagement of the pins with the outer ends of the slots, and to permit inward yielding, spring-opposed sliding movement of the shanks in the ear perforations by sliding of the pins in the slots, and to concurrently prevent rotation of the shanks in the ear perforations by engagement of the pins with the sides of the slots to maintain the toothed curved portions in their rotational plane; a tubular hub projected through the central perforation of the body and welded to the body with its medial transverse plane substantially coincident with the axes of the tooth shanks, to provide a bearing on which the wheel may rotate on the transverse supporting shaft of an agricultural implement; the said tapering projections being shorter radially than the teeth and opposing penetration of the teeth into the soil.

2. A rotary, agricultural, soil-working, toothed-wheel comprising a one-piece, stamped, generally circular, sheet-metal body having a central perforation and a circumferential series of outwardly extending peripheral projections; the body between each pair of projections having a pair of ears bent at an angle to the body from the body sheet metal and the pairs of ears having perforations therein respectively on a common generally radial axis; a generally radial slot in the body closed at its outer ends and disposed between each pair of ears; a plurality of teeth each having a shank slidably supported in a pair of ear perforations; a pair of shank projections extending from opposite sides of the shank at points between the pair of ears, one shank projection projecting into the slot; a coiled compression spring surrounding the shank and abutting at opposite ends upon an ear and upon the shank projections, and normally engaging the said one projection with the closed end of the slot; each tooth having a soil working portion extending outwardly farther than the said peripheral projections; a hub secured to the body and having a rotary bearing bore axially aligned with the central perforation, providing a rotary bearing upon which the wheel may rotate on the transverse shaft of an agricultural implement.

3. In a rotary, agricultural, soil-working, toothed-wheel, a main base comprising a one-piece, generally circular, stamped-out sheet metal, planar, disc-like body, provided with a circular series of pairs of ears bent from the sheet metal of the body, the ears of each pair having, respectively, aligned perforations on a common generally radial axis; the body provided with a circular series of generally radial slots closed at their outer ends and each slot disposed between a pair of ears; and the body provided with a central perforation sized to telescope over a wheel supporting implement shaft.

4. In a rotary, agricultural, soil-working, toothed-wheel, a body generally of disc form and generally in a single plane, said body provided with a central rotary bearing hub; a plurality of pairs of supports upstanding from the plane of the body; the pairs of supports disposed around the central hub; a pair of aligned bearings in each pair of supports on a common axis in the generally radial direction; a soil working tooth having a shank freely reciprocable in each pair of bearings; a spring reacting on each shank and on the body yieldably holding the shanks reciprocated outwardly; guide means on the body and shanks preventing rotation of the shanks in the bearings and permitting reciprocation thereof; and stop means limiting spring-effected reciprocation of the shanks.

EUGENE R. SIMON.

REFERENCES CITED

The following references are of record in the file of this patent:

UNITED STATES PATENTS

| Number | Name | Date |
|--------|------|------|
| 329,494 | Schweinfurt | Nov. 3, 1885 |
| 407,512 | Clark | July 23, 1889 |
| 612,528 | Perrier | Oct. 18, 1898 |
| 881,274 | Williams | Mar. 10, 1908 |
| 1,531,064 | Bennett | Mar. 24, 1925 |
| 1,905,384 | Jass | Apr. 25, 1933 |